(12) United States Patent
Rozas et al.

(10) Patent No.: US 8,019,983 B1
(45) Date of Patent: *Sep. 13, 2011

(54) SETTING A FLAG BIT TO DEFER EVENT HANDLING TO A SAFE POINT IN AN INSTRUCTION STREAM

(76) Inventors: Guillermo J. Rozas, Los Gatos, CA (US); Alexander Klaiber, Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/002,983

(22) Filed: Dec. 18, 2007

Related U.S. Application Data

(63) Continuation of application No. 10/406,022, filed on Apr. 2, 2003, now Pat. No. 7,310,723.

(51) Int. Cl.
*G06F 9/00* (2006.01)
(52) U.S. Cl. .......................... 712/244; 712/218
(58) Field of Classification Search ............... 712/24, 712/218, 244
See application file for complete search history.

(56) References Cited

U.S. PATENT DOCUMENTS

| | | | |
|---|---|---|---|
| 4,434,459 A | 2/1984 | Holland et al. | |
| 4,794,522 A | 12/1988 | Simpson | |
| 5,167,023 A | 11/1992 | de Nicolas et al. | |
| 5,361,389 A | 11/1994 | Fitch | |
| 5,494,821 A | 2/1996 | Takahashi et al. | |
| 5,537,559 A | 7/1996 | Kane et al. | |
| 5,596,390 A | 1/1997 | Sawada | |
| 5,625,835 A | 4/1997 | Ebcioglu et al. | |
| 5,636,366 A | 6/1997 | Robinson et al. | |
| 5,649,136 A * | 7/1997 | Shen et al. ..................... | 712/244 |
| 5,668,969 A | 9/1997 | Fitch | |
| 5,692,169 A | 11/1997 | Kathail et al. | |
| 5,721,927 A | 2/1998 | Baraz et al. | |
| 5,724,590 A | 3/1998 | Goettelmann et al. | |
| 5,748,936 A | 5/1998 | Karp et al. | |
| 5,751,942 A | 5/1998 | Christensen et al. | |
| 5,751,982 A | 5/1998 | Morley | |
| 5,757,942 A | 5/1998 | Kamatani et al. | |
| 5,761,467 A * | 6/1998 | Ando ........................... | 712/200 |
| 5,784,585 A | 7/1998 | Denman | |
| 5,790,625 A | 8/1998 | Arimilli | |
| 5,790,825 A | 8/1998 | Traut | |
| 5,832,202 A * | 11/1998 | Slavenburg et al. ............ | 714/16 |
| 5,832,205 A | 11/1998 | Kelly et al. | |
| 5,842,017 A | 11/1998 | Hookway et al. | |
| 5,867,681 A | 2/1999 | Worrell et al. | |
| 5,875,318 A | 2/1999 | Langford | |
| 5,915,117 A * | 6/1999 | Ross et al. ..................... | 710/262 |

(Continued)

FOREIGN PATENT DOCUMENTS

EP 0908820 4/1999

(Continued)

OTHER PUBLICATIONS

Bala et al.; "Transparent Dynamic Optimization: The Design and Implementation of Dynamo;" HP Laboratories Cambridge HPL-1999-78; Jun. 1999.

(Continued)

*Primary Examiner* — David J Huisman

(57) ABSTRACT

Methods and systems thereof for exception handling are described. An event to be handled is identified during execution of a code sequence. A bit is set to indicate that handling of the event is to be deferred. An exception corresponding to the event is generated if the bit is set.

14 Claims, 6 Drawing Sheets

U.S. PATENT DOCUMENTS

| | | | |
|---|---|---|---|
| 5,925,123 | A | 7/1999 | Tremblay et al. |
| 5,948,112 | A | 9/1999 | Shimada et al. |
| 6,011,908 | A | 1/2000 | Wing et al. |
| 6,031,992 | A | 2/2000 | Cmelik et al. |
| 6,032,244 | A | 2/2000 | Moudgill |
| 6,044,450 | A | 3/2000 | Tsushima et al. |
| 6,052,708 | A | 4/2000 | Flynn et al. |
| 6,091,897 | A | 7/2000 | Yates et al. |
| 6,112,299 | A | 8/2000 | Ebcioglu et al. |
| 6,164,841 | A | 12/2000 | Mattson, Jr. et al. |
| 6,199,152 | B1 | 3/2001 | Kelly et al. |
| 6,202,143 | B1 | 3/2001 | Rim |
| 6,230,260 | B1 | 5/2001 | Luick |
| 6,308,318 | B2 | 10/2001 | Krishnaswamy |
| 6,351,844 | B1 | 2/2002 | Bala |
| 6,356,615 | B1 | 3/2002 | Coon et al. |
| 6,363,336 | B1 | 3/2002 | Banning et al. |
| 6,408,325 | B1 | 6/2002 | Shaylor |
| 6,415,379 | B1 | 7/2002 | Keppel et al. |
| 6,434,710 | B1 * | 8/2002 | Sato et al. ............... 714/2 |
| 6,463,582 | B1 | 10/2002 | Lethin et al. |
| 6,594,821 | B1 | 7/2003 | Banning et al. |
| 6,615,300 | B1 | 9/2003 | Banning et al. |
| 6,658,551 | B1 | 12/2003 | Berenbaum et al. |
| 6,704,925 | B1 | 3/2004 | Bugnion |
| 6,714,904 | B1 | 3/2004 | Torvalds et al. |
| 6,738,892 | B1 | 5/2004 | Coon et al. |
| 6,845,353 | B1 | 1/2005 | Bedichek et al. |
| 6,871,274 | B2 | 3/2005 | Nunomura |
| 6,990,658 | B1 | 1/2006 | Torvalds et al. |
| 7,089,404 | B1 | 8/2006 | Rozas et al. |
| 7,096,460 | B1 | 8/2006 | Banning et al. |
| 7,107,580 | B2 | 9/2006 | Zemach et al. |
| 7,111,096 | B1 | 9/2006 | Banning et al. |
| 7,240,186 | B2 * | 7/2007 | Bell et al. ............... 712/244 |
| 7,331,041 | B1 | 2/2008 | Torvalds et al. |
| 7,404,181 | B1 | 7/2008 | Banning et al. |
| 7,475,230 | B2 | 1/2009 | Chou et al. |
| 2002/0092002 | A1 | 7/2002 | Babaian et al. |
| 2004/0015967 | A1 | 1/2004 | Morris |
| 2005/0060705 | A1 | 3/2005 | Katti et al. |
| 2007/0006189 | A1 | 1/2007 | Li et al. |

FOREIGN PATENT DOCUMENTS

| | | |
|---|---|---|
| WO | 0148605 | 7/2001 |

OTHER PUBLICATIONS

Cifuentes, Cristina and Malhotra, Vishv, Binary Translation: Static, Dynamic, Retargetable?, International Conference on Software Mainteance, Nov. 4-8, 1996.

Holzle, Urs, Adaptive Optimization for Self: Reconciling High Performance with Exploratory Programming, Dotorial Dissertation, Aug. 1994.

Ung et al.; "Dynamic Re-Engineering of Binary Code With Run-Time Feedbacks;" Department of Computer Science and Electrical Engineering, University of Queensland, QLD, Australia; 2000.

Ung et al.; "Machine-Adaptable Dynamic Binary Translation;" Proceedings of the ACM Sigplan Workshop on Dynamic and Adaptive Compilation and Optimization, Jan. 2000 pp. 30-40.

*Ex Parte Quayle* Dated Jul. 2, 2008; U.S. Appl. No. 09/417,332.
Final OA Dated Jan. 18, 2007; U.S. Appl. No. 09/417,332.
Final OA Dated Feb. 13, 2004; U.S. Appl. No. 09/417,332.
Non Final OA Dated May 10, 2004; U.S. Appl. No. 09/417,332.
Non Final OA Dated Jan. 30, 2008; U.S. Appl. No. 09/417,332.
Non Final OA Dated May 13, 2003; U.S. Appl. No. 09/417,332.
Non Final OA Dated Jul. 26, 2007; U.S. Appl. No. 09/417,332.
Notice of Allowance Dated Jan. 12, 2009; U.S. Appl. No. 09/417,332.
Notice of Allowance Dated Sep. 8, 2008; U.S. Appl. No. 09/417,332.
Non Final OA Dated Mar. 29, 2006; U.S. Appl. No. 10/406,022.
Notice of Allowance Dated Jul. 27, 2007; U.S. Appl. No. 10/406,022.
Notice of Allowance Dated Feb. 21, 2003; U.S. Appl. No. 09/539,987.
Interview Summary Dated Apr. 14, 2003; U.S. Appl. No. 09/417,358.
Non Final OA Dated Apr. 25, 2002; U.S. Appl. No. 09/417,358.
Non Final OA Dated Dec. 20, 2000; U.S. Appl. No. 09/417,358.
Notice of Allowance Dated Jun. 20, 2003; U.S. Appl. No. 09/417,358.
OA Dated Sep. 6, 2001; U.S. Appl. No. 09/417,358.
Non-Final Office Action Mailed Jun. 26, 2006; 10672790.
Final Office Action Mailed Dec. 20, 2006; 10672790.
Non-Final Office Action Mailed Sep. 24, 2007; 10672790.
Final Office Action Mailed Apr. 11, 2008; 10672790.
Non-Final Office Action mailed Apr. 13, 2009; 10672790.
Notice of Allowance; Mail Date Mar. 29, 2006; U.S. Appl. No. 10/463,846.
Non Final Office Action; Mail Date Nov. 14, 2005; U.S. Appl. No. 10/463,846.
Final Office Action; Mail Date Jun. 20, 2005; U.S. Appl. No. 10/463,846.
Non Final Office Action: Mail Date Jan. 5, 2005; U.S. Appl. No. 10/463,846.
Notice of Allowance; Mail Date Mar. 17, 2008; U.S. Appl. No. 11/507,779.
Non Final Office Action; Mail Date Oct. 09, 2007; U.S. Appl. No. 11/507,779.
Non Final Office Action; Mail Date Jun. 8, 2007; U.S. Appl. No. 11/507,779.
Non Final Office Action; Mail Date Apr. 27, 2009; U.S. Appl. No. 12/177,836.
Non Final Office Action; Mail Date Mar. 3, 2006; U.S. Appl. No. 10/670,900.
Non Final Office Action; Mail Date May 26, 2009; U.S. Appl. No. 09/417,332.
Notice of Allowance; Mail Date Nov. 17, 2009; U.S. Appl. No. 09/417,332.
Advisory Action; Mail Date Dec. 31, 2009; U.S. Appl. No. 12/177,836.
Final Office Action; Mail Date Oct. 22, 2009; U.S. Appl. No. 12/177,836.
Non-Final OA Dated Sep. 28, 2009; U.S. Appl. No. 11/169,404.
Notice of Allowance Dated Nov. 17, 2009; U.S. Appl. No. 09/417,332.
Non-Final OA Dated May 26, 2009; U.S. Appl. No. 09/417,332.
Final OA Dated Oct. 22, 2009; U.S. Appl. No. 12/177,836.
Hwu et al. "Checkpoint repair for out-of-order execution machines", Proceedings of the 14th annual international symposium on Computer architecture, 1987, pp. 18-26.
Non-Final Office Action Mailed Dec. 8, 2010; U.S. Appl. No. 11/169,404; pp. 3-12.
Final Office Action Mailed Apr. 15, 2010; U.S. Appl. No. 11/169,404; pp. 4-11.
Advisory Action Mailed Jun. 29, 2010; U.S. Appl. No. 111169,404; p. 2.
Non-Final Office Action Mailed Nov. 24, 2010; U.S. Appl. No. 12/578,500; pp. 3-5.
Non-Final Office Action Mailed Feb. 23, 2010; U.S. Appl. No. 12/177,836; pp. 2-3.
Non-Final Office Action Mailed Jun. 18, 2010; U.S. Appl. No. 12/177,836; p. 2.
Notice of Allowance Mailed Nov. 2, 2010; U.S. Appl. No. 12/177,836; pp. 1-2.
Final Office Action; Mail Date Jun. 17, 2011; U.S. Appl. No. 11/169,404; pp. 2-10.
Final Office Action; Mail Date Apr. 27, 2011; U.S. Appl. No. 12/578,500; pp. 2-13.
ProQuest. "Adaptive optimization for self: Reconciling high performance with exploratory programming"; by Holzle, Urs, Ph.D., Stanford University; showing accession date of Apr. 1995; p. 1 (second page is blank).
Computer Dictionary; Second Edition; Microsoft Press, Oct. 27, 1993, pp. 85-86.
Computer Dictionary; Third Edition; Microsoft Press; 1997; pp. 105-106.

* cited by examiner

500

```
┌─────────────────────────────────────────────────┐
│ TRANSLATE A SET OF NON-NATIVE INSTRUCTIONS INTO A│
│ SET OF NATIVE INSTRUCTIONS (A "TRANSLATION") FOR │
│        EXECUTION ON A HOST PROCESSOR             │
│                      510                         │
└─────────────────────────────────────────────────┘
                        │
                        ▼
┌─────────────────────────────────────────────────┐
│   DURING EXECUTION OF THE TRANSLATION ON THE HOST│
│       PROCESSOR, IDENTIFY AN EVENT THAT IS TO BE │
│        EXECUTED AT A SAFE POINT, THE IDENTIFICATION│
│     OCCURRING BETWEEN ARCHITECTURALLY PRECISE    │
│          POINTS OF EXECUTION OF THE TRANSLATION  │
│                      520                         │
└─────────────────────────────────────────────────┘
                        │
                        ▼
┌─────────────────────────────────────────────────┐
│   AT THE POINT OF IDENTIFICATION, SET A BIT OR BITS TO│
│   INDICATE THAT THE EVENT IS TO BE EXECUTED, AND │
│           DEFER EXECUTION OF THE EVENT           │
│                      530                         │
└─────────────────────────────────────────────────┘
                        │
                        ▼
┌─────────────────────────────────────────────────┐
│ AT A SAFE POINT, GENERATE AN EXCEPTION TO PERFORM│
│   THE EVENT IN RESPONSE TO THE SET BIT, WHEREIN THE│
│ EXCEPTION CAUSES THE EVENT TO BE PERFORMED BY AN │
│                EXCEPTION HANDLER                 │
│                      540                         │
└─────────────────────────────────────────────────┘
                        │
                        ▼
┌─────────────────────────────────────────────────┐
│      CLEAR THE BIT AND RESUME NORMAL OPERATION   │
│                      550                         │
└─────────────────────────────────────────────────┘
```

FIGURE 5

SETTING A FLAG BIT TO DEFER EVENT HANDLING TO A SAFE POINT IN AN INSTRUCTION STREAM

RELATED UNITED STATES PATENT APPLICATIONS

This application is a continuation of commonly-owned U.S. patent application Ser. No. 10/406,022 by G. Rozas et al., filed on Apr. 2, 2003, entitled "Methods and Systems Employing a Flag for Deferring Exception Handling to a Commit or Rollback Point," now U.S. Pat. No. 7,310,723, assigned to the assignee of the present invention, and hereby incorporated by reference in its entirety.

BACKGROUND OF THE INVENTION

1. Field of the Invention

Embodiments of the present invention relate to processors and microprocessors. More specifically, embodiments of the present invention relate to exception handling.

2. Related Art

At some point during execution of a code sequence (a stream of instructions or micro-instructions) by a processor or microprocessor, an event may be identified. The event can be internal or external to the processor or microprocessor. External events are also referred to as "interrupts" and internal events are also referred to as "traps."

According to the prior art, a trap is conventionally handled immediately by an exception handler that usually resides as software in main memory. This can be problematic if the event occurs at a time when a system is not prepared to handle it.

SUMMARY OF THE INVENTION

Embodiments of the present invention provide methods and systems thereof for handling exceptions.

BRIEF DESCRIPTION OF THE DRAWINGS

The accompanying drawings, which are incorporated in and form a part of this specification, illustrate embodiments of the invention and, together with the description, serve to explain the principles of these embodiments.

FIG. 5 is a flowchart of a process for exception handling according to one embodiment of the present invention.

DETAILED DESCRIPTION OF THE INVENTION

Figure 1:
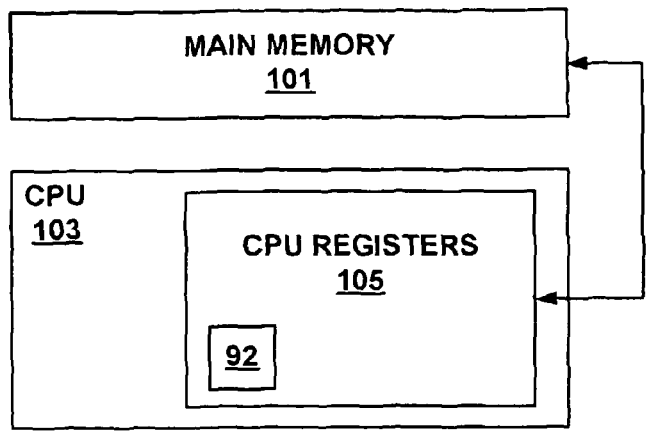
FIG. 1 is a block diagram illustrating one embodiment of a processor upon which embodiments of the present invention may be implemented.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "translating," "advancing," "rolling back," "identifying," "executing," "setting," "indicating," "generating," "clearing," "establishing," "running," or the like, refer to the action and processes (e.g., flowcharts 200 and 500 of FIGS. 2 and 5, respectively) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention may be practiced on a computer system that includes, in general, a central processing unit (CPU) for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

Exception Handling According to a First Embodiment

FIG. 1 is a block diagram illustrating one embodiment of a processor (CPU) 103 coupled to main memory 101. Main memory 101 functions as the primary workspace of a computer system and can include the operating system software and application software used by the computer system. CPU registers 105 are memory registers situated on the CPU chip (e.g., on processor 103).

At some point during the execution of a code sequence (a stream of instructions or micro-instructions) by the processor 103, an event (e.g., a trap) may be identified. According to one embodiment of the present invention, when an event is identified, a flag (e.g., bit 92) is set in one of the registers 105. The flag 92 can be set either in hardware or software.

Thus, according to the present embodiment, a new bit (e.g., a "trap bit") is added to the architecture of one of the control registers such as, but not limited to, one of the registers 105. The trap bit serves as a flag to indicate that an event has been identified during execution of the code sequence. Importantly, the event is not necessarily handled when it is identified. Instead, when the trap bit is set, an exception is raised (generated) at a later point in time. Accordingly, handling of the exception is deferred in time, to a point in time when it is safe to handle the event. The exception can then be handled by the associated handler.

The exception is generated at what is referred to herein as a "safe point." Generally, a safe point can be described as a point at which the exception can be handled without significantly disrupting other processing activities. In one embodiment, a safe point is identified via an explicit instruction in a code sequence. In another embodiment, there are N flag bits ($F_i$, where i=1, 2, . . . , N) in the registers 105, and the processor 103 provides N different instructions ($I_i$, where i=1, 2, . . . , N) for signaling safe points. Each of the flag bits $F_i$ corresponds to one of the instructions $I_i$. An exception in generated when instruction $I_i$ is issued and the flag bit $F_i$ is set.

In those instances in which a trap bit is not set, then an exception is not generated. Upon handling of an event, the trap bit is cleared in hardware or in software.

Figure 2:
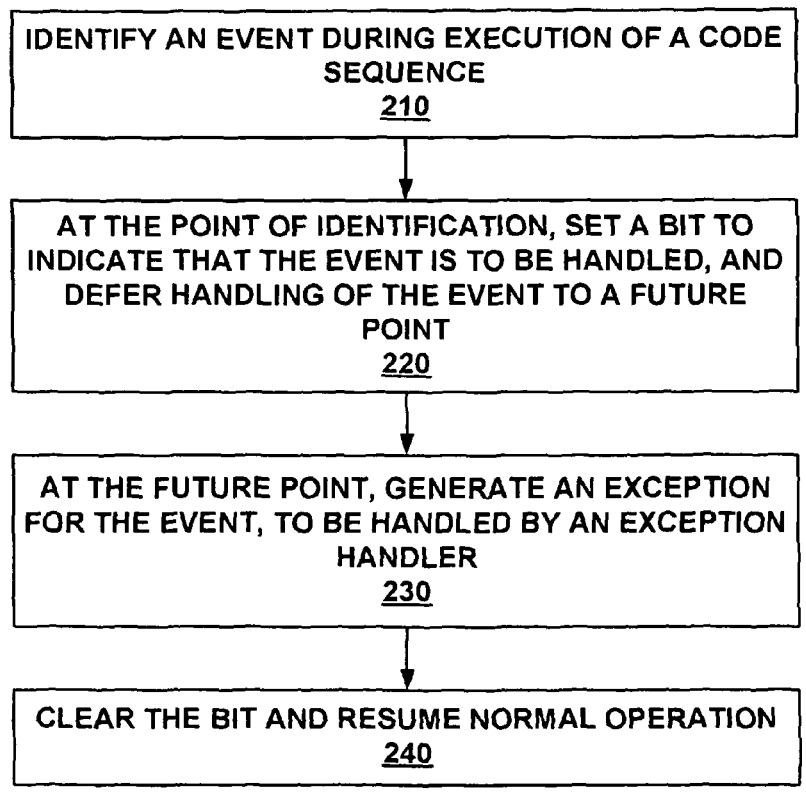
FIG. 2 is a flowchart of a process for exception handling according to one embodiment of the present invention.

FIG. 2 is a flowchart 200 of a process for exception handling according to a first embodiment of the present invention. Although specific steps are disclosed in flowchart 200, such steps are exemplary. That is, embodiments of the present invention are well suited to performing various other steps or variations of the steps recited in flowchart 200. It is appreciated that the steps in flowchart 200 may be performed in an order different than presented, and that not all of the steps in flowchart 200 may be performed. In one embodiment, the method of flowchart 200 is implemented using a processor such as processor (microprocessor) 103 of FIG. 1. In one such embodiment, the method of flowchart 200 is implemented as computer-readable instructions stored in memory (e.g., main memory 101) that is coupled to, or integrated with, processor 103.

In step 210 of FIG. 2, in the present embodiment, an event is identified during execution of a code sequence (an instruction stream). The code sequence may be part of a larger code sequence, or it may represent an entire set of code.

In step 220, in the present embodiment, a bit is set to indicate that the event referred to in step 210 has been identified and awaits handling. In general, according to the various embodiments of the present invention, the presence of an action to be performed (e.g., an event to be handled) is identified and flagged, allowing the action to be deferred until a later point in time. Accordingly, execution of the action (generating and handling of an exception) is deferred.

In step 230, in the present embodiment, a safe point is signaled, and an exception is generated and handled by an exception handler. The safe point can correspond to the end of the code sequence. The safe point can instead correspond to a point in the midst of executing the code sequence, at which the generation and handling of the exception can be legally performed. The safe point can also be correspond to a point in the code sequence that has been designated in advance for generating and handling exceptions, using an explicit instruction as described above.

In step 240, the bit set in step 220 is cleared and normal operation can resume.

Exception Handling According to a Second Embodiment

Figure 3A:
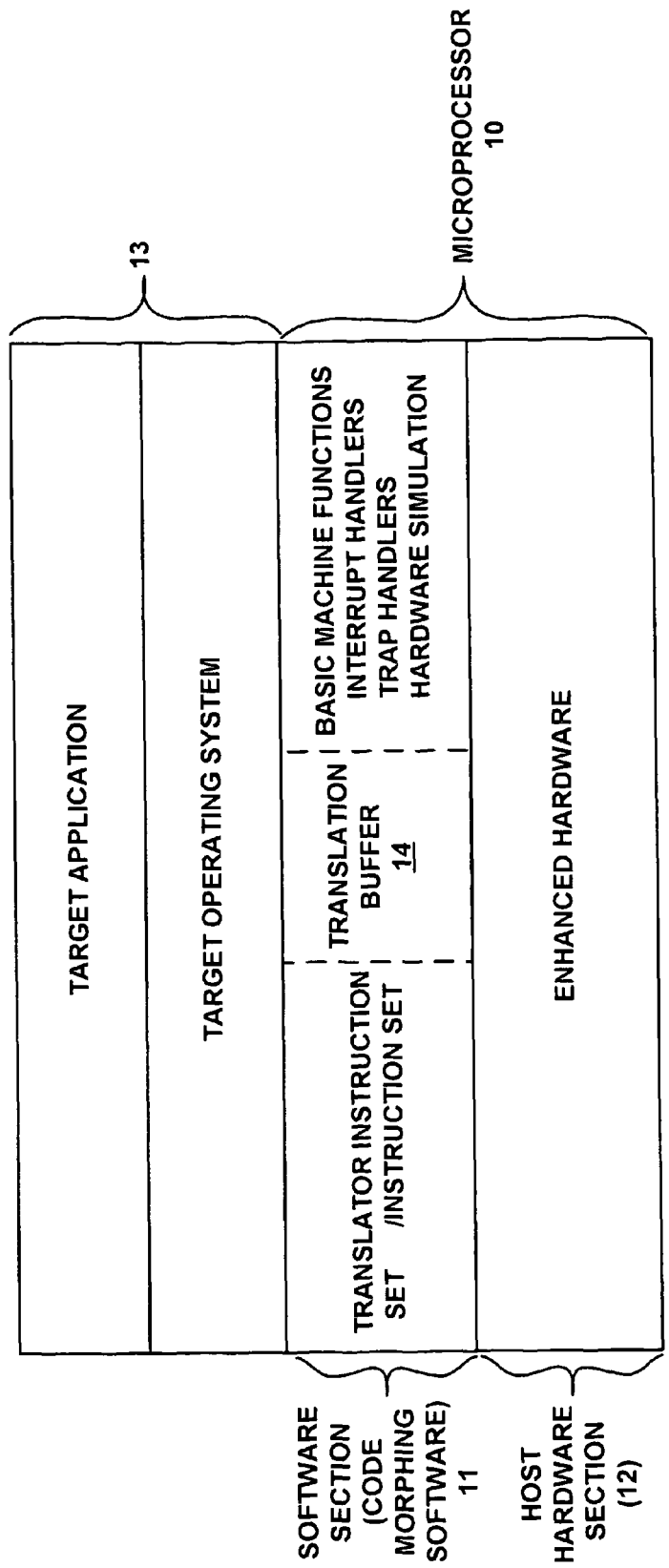
FIG. 3A is a block diagram of another embodiment of a processor upon which embodiments of the present invention may be implemented.

FIG. 3A is a block diagram of another embodiment of a processor (microprocessor) 10 upon which embodiments of the present invention can be implemented. In the present embodiment, processor 10 includes translation (Code Morphing™) software 11 and host hardware 12. The Code Morphing™ software 11 is for translating non-native instructions into native instructions for host hardware 12. In the present embodiment, the target (non-native) application furnishes the target (non-native) instructions (referred to together in FIG. 3A as element 13) to the Code Morphing™ software 11 for translation into host (native) instructions that the host hardware 12 is capable of executing. In the meantime, the target operating system receives calls from the target application program and transfers these to the Code Morphing™ software 11. In the present embodiment, the translation buffer 14 is used to store the host (native) instructions that embody each completed translation of the target (non-native) instructions.

As used herein, a "translation" refers to a sequence of native instructions that perform the same function as some set of non-native instructions. A translation can be viewed as having a beginning state and an ending state (the ending state is, in essence, the beginning state of the next translation). The beginning and ending states may be referred to as "commit points." Generally, a number of non-native instructions are translated between commit points, although there may be instances in which one or more commit points occur without advancing through the non-native instructions.

In one embodiment, the processor 10 provides instructions to commit register and memory changes made since the last commit point, and other instructions to undo—or rollback—these changes. In such an embodiment, the commit and/or rollback operations can naturally establish safe points at which pending events can be executed (handled). Thus, the commit and/or rollback operations can be used to signal safe points in a manner similar to that described above.

One embodiment of a processor 10, which includes the Code Morphing™ software 11 and the host hardware 12 described above, is described further by U.S. Pat. No. 6,031,992, "Combining Hardware and Software to Provide an Improved Microprocessor," by Robert F. Cmelik et al., dated Feb. 29, 2000, assigned to the assignee of the present invention, and hereby incorporated by reference in its entirety.

Figure 3B:
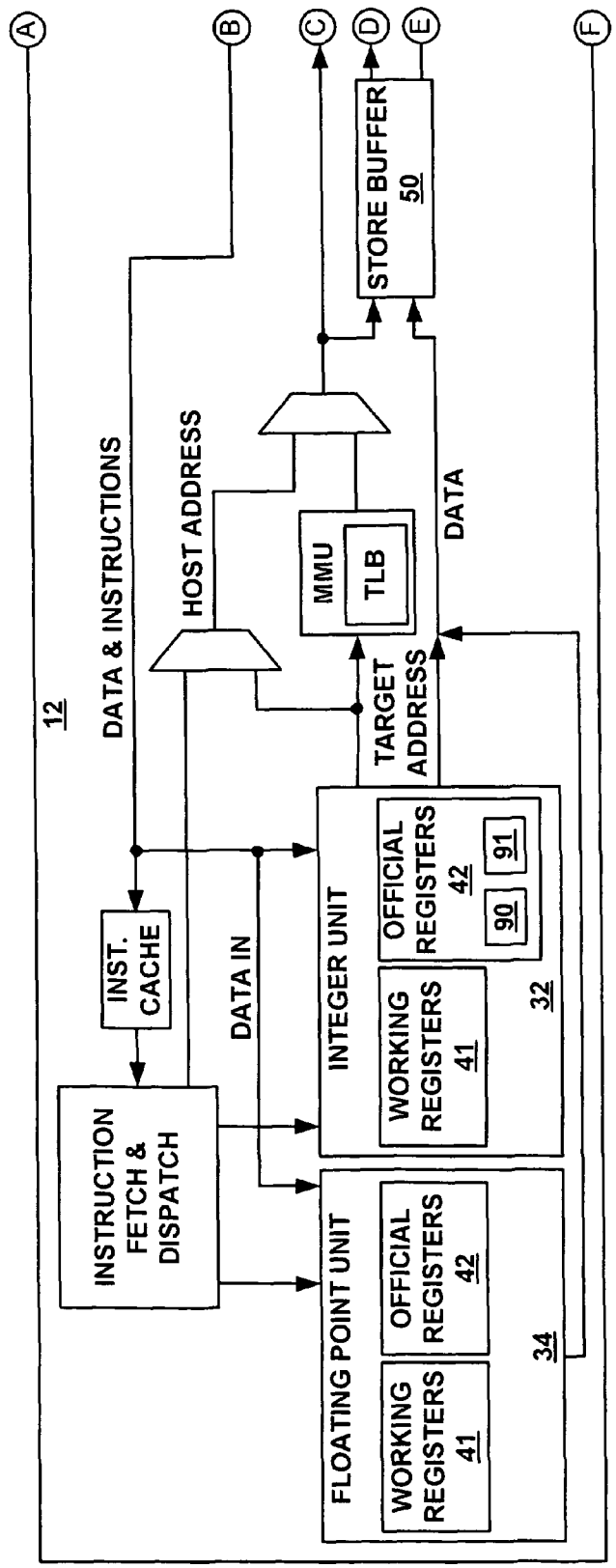
FIG. 3B is a block diagram showing some details of the processor of FIG. 3A according to one embodiment of the present invention.
Figure 3B:
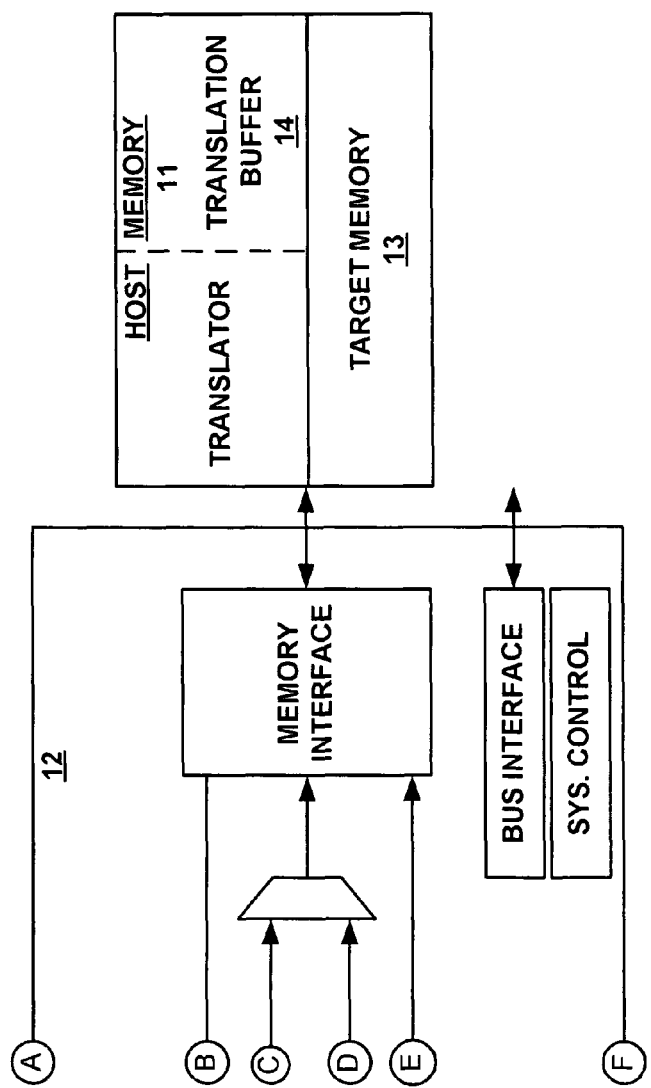

Referring now to FIG. 3B, a set of official (architecturally visible) target registers 42 is provided by the host hardware 12 to hold the state of the registers of a target processor for which an application was designed. The registers 42 can be included in each of the floating point units 34, any integer units 32, and any other execution units.

According to the present embodiment, the registers 41 and 42 allow for the maintenance of a set of host or working registers (41) for processing the host (native) instructions, and a set of target (or shadow) registers (42) to hold the official state of the target processor for which a target application was created. The target (or shadow) registers 42 are coupled to their working register 41 equivalents through an interface that allows an operation that may be referred to as "commit" to quickly transfer the content of all working registers 41 to target registers 42, and allows an operation that may be referred to as "rollback" to quickly transfer the content of all target registers 42 back to their working register 41 equivalents.

When a translation has been executed by host hardware 12 without error, then the information in the store buffer 50 generated during the execution is moved together past the gate of the store buffer 50 (e.g., it is committed) and subsequently written to translation buffer 14. This marks an architecturally precise point in execution, where the state of these registers is the same with respect to the native and non-native application programs.

Figure 4A:
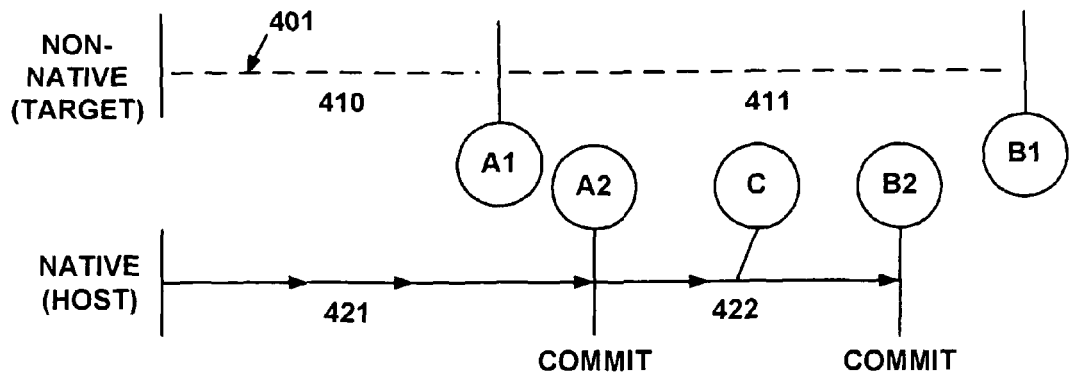
FIGS. 4A, 4B and 4C illustrate operations for establishing instruction state points according to one embodiment of the present invention.
Figure 4B:
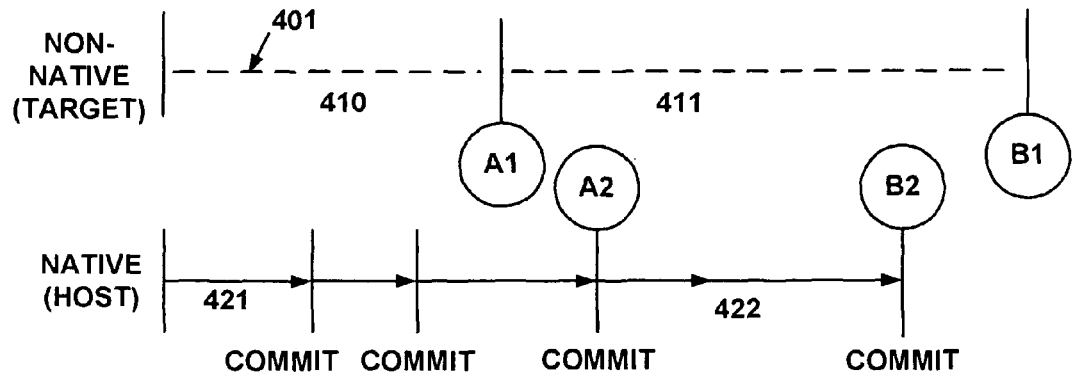
Figure 4C:
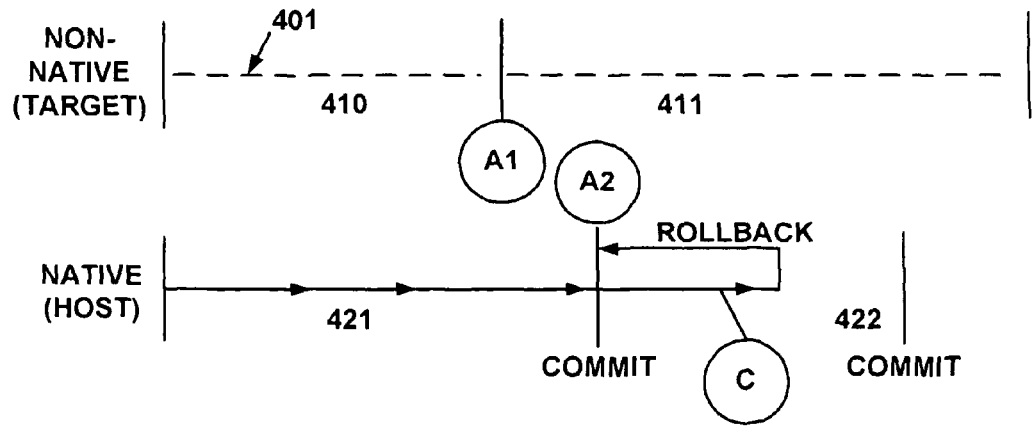

FIGS. 4A, 4B and 4C illustrate commit and rollback operations for establishing instruction state points according to one embodiment of the present invention. Referring first to FIG. 4A, two sequences 410 and 411 of non-native (target) instructions are illustrated in parallel with two sequences of native (host) instructions 421 and 422. The non-native instruction sequences 410 and 411 are translated into native instruction sequences 421 and 422, respectively, using translation or Code Morphing™ software 11 of FIGS. 3A and 3B. To help visualize the difference between non-native and native instructions, the non-native instructions may be considered as existing in relatively discrete forms, while the native instructions may be considered as being relatively amorphous between commit points. An exemplary non-native instruction is represented as element 401.

The native instruction sequences 421 and 422 are demarcated by a beginning state point and an ending state point that may generally be referred to as commit points. FIG. 4A shows a translation as extending between two commit points. However, a translation may also include multiple commit points, as illustrated by FIG. 4B. Generally, a number of non-native instructions are translated between commit points, although there may be instances in which one or more commit points occur without advancing through the non-native instructions.

Referring to FIG. 4A, the functionality provided by the sequence of non-native instructions 411 lying between the points identified as A1 and B1, and the functionality provided by the sequence of native instructions 422 lying between the points identified as A2 and B2, is essentially equivalent. The state at point A1 is essentially consistent (coherent) with the state at point A2, and similarly the states at points B1 and B2 are essentially coherent. A similar statement may be made about states A1 and A2 of FIG. 4C. Points A1 and A2 may be said to be architecturally precise, and points B1 and B2 may also be called architecturally precise. At architecturally precise points, the architecturally visible registers (e.g., registers 42 of FIG. 3B) will contain the same state for native instructions as if for non-native instructions, and the native instructions will be at the same execution point as if for non-native instructions.

At some point during the execution of the translation by the processor 10, an event may be identified by the Code Morphing™ software 11 (refer to FIG. 3A), or processor hardware, or a combination thereof. This point is identified as point C in FIGS. 4A and 4C.

According to one embodiment of the present invention, when such an event is identified, a flag (e.g., either bit 90 or 91 of FIG. 3B) is set in one of the control registers (e.g., one of the target registers 42 of FIG. 3B) by the Code Morphing™ software 11. The flag can be set either in hardware or in software.

Thus, in one embodiment, a new bit (e.g., a "trap on commit bit") is added to the architecture of one of the control registers. The trap on commit bit serves as a flag to indicate that an event has been identified. Importantly, the event is not necessarily handled when it is identified. Instead, when the trap on commit bit is set, an exception corresponding to the action is raised at the next safe point (at the upcoming commit point, or at a preceding commit point that is reached by a rollback). Accordingly, handling of the event is deferred in time, to a point in time when it is safe to handle the event.

As mentioned above, the commit and/or rollback operations can naturally establish safe points at which pending events can be executed (handled). Thus, the occurrence of a commit or rollback operation can be used to signal the arrival of a safe point. The exception can then be handled by the associated handler.

In another embodiment, instead of a single trap on commit bit, two new bits are added to the architecture of one of the control registers. In this embodiment, one bit is set to generate an exception when a commit operation occurs, and the other bit is set to generate an exception when a rollback operation occurs. These bits are represented as bits 90 and 91 in FIG. 3B. Although these bits are shown as residing in one of the registers 42, it is appreciated that these bits may reside elsewhere.

In those instances in which a trap on commit bit is not set, then an exception is not generated. Upon handling of the exception, the trap on commit bit is cleared in hardware or in software.

FIG. 5 is a flowchart 500 of a process for exception handling according to one embodiment of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. In one embodiment, the method of flowchart 500 is implemented using a processor such as processor (microprocessor) 10 of FIG. 3A. In one such embodiment, the method of flowchart 500 is implemented as computer-readable instructions (e.g., translation or Code Morphing™ software 11 of FIG. 3A) stored in memory (e.g., ROM) that is coupled to, or integrated with, processor 10.

In step 510 of FIG. 5, in the present embodiment, non-native instructions are translated into native instructions. In one embodiment, the non-native instructions are substantially compatible with the x86 instruction architecture, and the native instructions are very long instruction word (VLIW) instructions. In one embodiment, the non-native instructions are translated in software for execution on a native (host) processor. The native instructions (which may be known as a translation) are demarcated by a beginning point and an ending point, which may also be referred to architecturally precise points or commit points. As noted above, a translation may include multiple commit points. Also, in general, a number of non-native instructions are translated between native instruction commit points, although there may be instances in which one or more commit points occur without advancing through the non-native instructions.

In step 520, in the present embodiment, an event is identified during execution of the translation. In other words, identification of this event occurs between architecturally precise points of the translation being executed. The event can only be handled at a safe point such as the beginning or ending point demarcating the translation (e.g., at a commit or architecturally precise point). Examples of such events are changes in cacheability, which may not be able to occur in the midst of instruction execution, and interrupt acceptance or handling.

In step 530, in one embodiment, a bit is set to indicate that the event referred to in step 520 has been identified and is to be handled. In one embodiment, a single bit is instead used to indicate that the action is to be performed at the next safe point that occurs according to a commit or rollback operation. In another embodiment, two bits are used, one bit to indicate that the event is to be handled at the next commit point that occurs according to a commit operation, and the other bit to indicate that the action is to be performed at the next commit point that occurs according to a rollback operation. Although described for one or two bits, the present invention is not so limited. In addition, there may be other mechanisms for identifying that an event has been identified during translation. In general, according to the various embodiments of the present invention, the presence of an event to be handled at an upcoming safe point (e.g., the next commit point, or the preceding commit point that is returned to via rollback) is identified and flagged, allowing the action to be deferred until that safe point is reached. Accordingly, handling of the event is deferred.

In step 540, in the present embodiment, an exception (or trap or interrupt or the like) for the event is generated at the next safe point (e.g., following either a commit or rollback operation). The exception is handled by an exception handler that performs the action. Accordingly, the event is identified at an architecturally imprecise point, and the event is handled is at an architecturally precise point.

In step 550, in the present embodiment, the bit set in step 530 is cleared and normal operation can resume.

Embodiments of the present invention have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-readable storage device having stored thereon, computer-executable instructions that, responsive to execution by a computing device, cause the computing device to perform operations comprising:
during execution of a stream of instructions demarcated by a first commit instruction and a second commit instruction and without an intervening commit instruction after the first commit instruction and before the second commit instruction, identifying an event to be handled, wherein the event is associated with a first instruction in the stream;
setting a flag bit to indicate deferred handling of the event; and
generating an exception corresponding to the event if the flag bit is set, wherein the exception causes the event to be handled at the first commit instruction if a rollback operation occurs during the execution of the stream of instructions and otherwise at the second commit instruction.

2. The computer-readable storage device of claim 1 wherein there are a plurality of flag bits and a corresponding number of instructions, wherein one of the flag bits is set for each event identified during execution of the stream, wherein an exception is generated for each of the flag bits that is set.

3. The computer-readable storage device of claim 1 wherein the event is a trap.

4. The computer-readable storage device of claim 1 wherein the stream comprises native instructions translated from non-native instructions.

5. The computer-readable storage device of claim 4 wherein the non-native instructions comprise x86 instructions and wherein the native instructions comprise Very Long Instruction Word (VLIW) instructions.

6. The computer-readable storage device of claim 1 wherein two flag bits are used for indicating that the event is to be handled, wherein one of the two flag bits is for indicating the exception is to be handled at the first commit instruction and the other of the two flag bits is for indicating the exception is to be handled at the second commit instruction.

7. The computer-readable storage device of claim 1 wherein the operations further comprise clearing the flag bit.

8. A computer system comprising:
a processor; and
memory coupled to the processor and having stored therein instructions that, if executed by the computer system, cause the computer system to perform operations comprising:
during execution of a stream comprising multiple instructions, wherein the stream is demarcated by a first commit instruction and a second commit instruction and wherein the first and second commit instructions comprise consecutive commit instructions without an intervening commit instruction, identifying an event to be handled, wherein the event is associated with a first instruction of the multiple instructions;
setting a flag bit to indicate that the event is identified but handling of the event is to be deferred; and
generating an exception corresponding to the event if the flag bit is set, wherein the exception causes the event to be handled at the second commit instruction unless a rollback operation occurs during the execution of the stream and at the first commit instruction if the rollback operation occurs.

9. The computer system of claim 8 wherein there are a plurality of flag bits and a corresponding number of instructions, wherein one of the flag bits is set for each event identified during execution of the stream, wherein an exception is generated for each of the flag bits that is set.

10. The computer system of claim 8 wherein the event is a trap.

11. The computer system of claim 8 wherein the stream of the multiple instructions comprises native instructions translated from non-native instructions.

12. The computer system of claim 11 wherein the non-native instructions comprise x86 instructions and wherein the native instructions comprise Very Long Instruction Word (VLIW) instructions.

13. The computer system of claim 8 wherein two flag bits are used for indicating that the event is to be handled, wherein one of the two flag bits is for indicating the exception is to be handled at the first commit instruction and the other of the two flag bits is for indicating the exception is to be handled at the second commit instruction.

14. The computer system of claim 8 wherein the operations further comprise clearing the flag bit.

* * * * *

UNITED STATES PATENT AND TRADEMARK OFFICE
CERTIFICATE OF CORRECTION

PATENT NO. : 8,019,983 B1
APPLICATION NO. : 12/002983
DATED : September 13, 2011
INVENTOR(S) : Rozas et al.

It is certified that error appears in the above-identified patent and that said Letters Patent is hereby corrected as shown below:

Title Page 2, item (56), under "Other Publications", in Column 1, Line 3, delete "Mainteance," and insert --Maintenance, --.

Title Page 2, item (56), under "Other Publications", in Column 1, Line 5, delete "Dotorial" and insert -- Doctorial --.

Title Page 2, item (56), under "Other Publications", in Column 1, Line 11, delete "Adapative" and insert -- Adaptive --.

Title Page 2, item (56), under "Other Publications", in Column 2, Line 49, delete "111169,404;" and insert -- 11/169,404; --.

Signed and Sealed this
Twenty-first Day of February, 2012

David J. Kappos
*Director of the United States Patent and Trademark Office*